W. R. ALLEN & A. McNALLY.
VEHICLE WHEEL.
APPLICATION FILED SEPT. 5, 1914.
1,143,480.
Patented June 15, 1915.
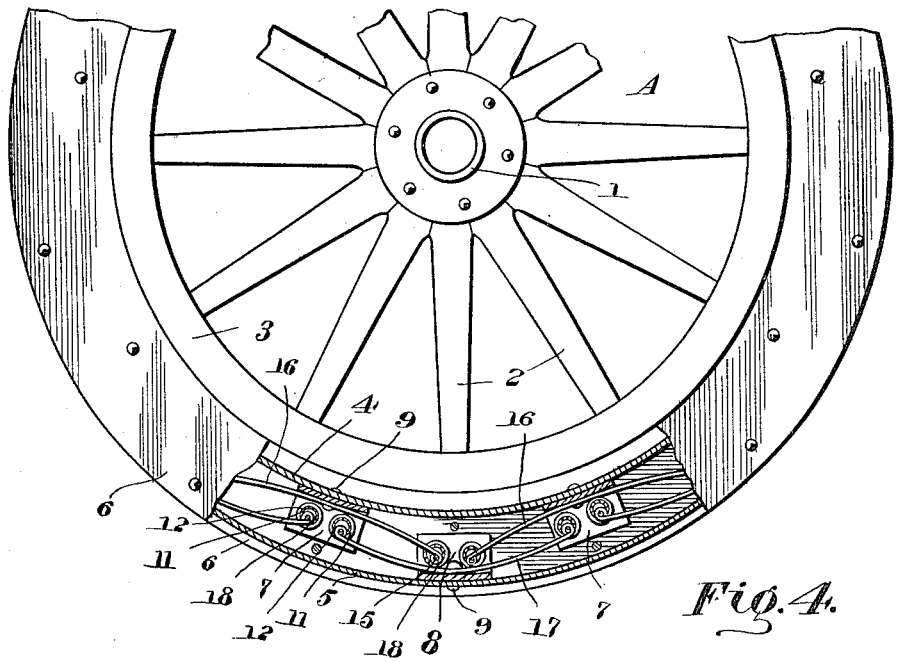
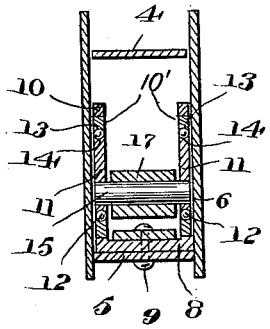
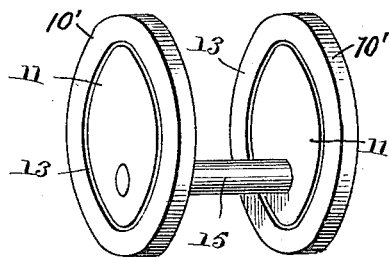
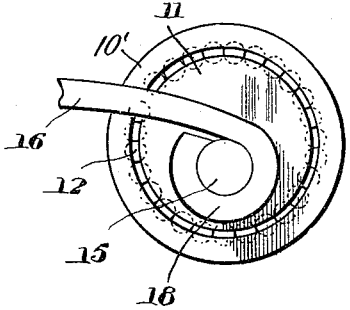
Witnesses
Frederick W. Ely
Fo. Ackman Jr.
Inventors
W. R. Allen,
A. McNally.
By Victor J. Evans
Attorney

UNITED STATES PATENT OFFICE.

WILLIAM R. ALLEN AND ALOYSIUS McNALLY, OF BLAINE, WASHINGTON.

VEHICLE-WHEEL.

1,143,480.   Specification of Letters Patent.   Patented June 15, 1915.

Application filed September 5, 1914.   Serial No. 860,424.

*To all whom it may concern:*

Be it known that we, WILLIAM R. ALLEN and ALOYSIUS McNALLY, citizens of the United States, residing at Blaine, in the county of Whatcom and State of Washington, have invented new and useful Improvements in Vehicle-Wheels, of which the following is a specification.

This invention relates to vehicle wheels, the object in view being to provide a resilient or spring wheel of such construction as to enable the usual pneumatic tire to be done away with and all of the usual troubles incident to the use thereof.

More specifically, the object of the present invention is to provide in combination with a fixed rim and a tire carrying rim, a novel and effective arrangement of saddles, interposed springs, and eccentric rollers to which the spring terminals are connected, the arrangement being such that all ordinary road shocks are absorbed by the springs and prevented from being transmitted to the wheels and axles of the machine.

With the above and other objects in view, the invention consists in the novel construction, combination and arrangement of parts, as herein described, illustrated and claimed.

In the accompanying drawings: Figure 1 is a side elevation partly broken away of a vehicle wheel embodying the present invention. Fig. 2 is a cross section through the same on an enlarged scale. Fig. 3 is an enlarged detail elevation showing one of the spring sustaining rollers. Fig. 4 is a detail perspective view showing a pair of said rollers and the connecting journal pin.

Referring to the drawings A generally designates a vehicle wheel comprising the hub 1, spokes 2 and felly 3.

In carrying out the present invention, a fixed inner rim 4 is secured to the felly 3 and outside of the rim 4 in spaced relation thereto and normally concentric therewith is a tire carrying rim 5 to which a tire of any description may be fastened. Secured to the opposite side edges of the rim 5 are annular housing plates 6 which extend inwardly and ride against the edges of the fixed rim 4 as illustrated in Fig. 2 for the purpose of excluding foreign matter from the parts hereinafter described and contained between the inner and outer rims 4 and 5, respectively.

Secured to the inner rim 4 is a circular series of saddles 7, another circular series of saddles 8 being fastened to the outer rim 5, said saddles being shown as riveted at 9 to their respective rims. Each of the saddles is provided with the opposite flanges or side portions 10 and in each of said side portions or flanges there are placed rings 10′ in which are mounted two rollers 11 each ring 10′ and roller 11 being set flush in the flange 10 adapting the roller to turn with a minimum amount of friction by means of anti-friction ball bearings 12 arranged in a circular series in ball races consisting of grooves 13 and 14 formed in the parts 10′ and 11 as shown in the cross sectional view, Fig. 2. Each pair of oppositely located rollers is connected by a journal pin 15 which is eccentric to the rollers 11 as best illustrated in Figs. 3 and 4.

Connected in fixed relation to the inner rim 4 is a circular series of bowed springs 16 while another circular series of similar springs 17 is fastened to the outer rim 5. The springs of the two series are arranged alternately as shown in Fig. 1 and secured in alternate order to the inside and outside rims. The springs are also reversely disposed and each of said springs is provided with terminal eyes 18 which eyes receive the appropriate journal pins 15 above described. By reference to Fig. 1, it will be seen that each of the springs 16 and 17 is secured to its respective rim centrally of the spring while the terminal eyes 18 thereof are connected to the journal pins 15 of the rollers 11 of every other saddle, the central portion of each spring passing through one of the saddles and being connected thereto by one of the rivets or fasteners 9 while the terminal portions of said spring are confined between the flanges or side portions 10 of the adjacently located saddles. This serves to effectively brace the outside rim relatively to the inside rim against lateral strain, the annular housing plates 6 also contributing to the lateral support and bracing of the outer rim 5.

From the foregoing description it will be seen that an easy movement is provided for the reversely arranged load sustaining and shock absorbing springs caused by the rotation of the rollers 11 in their bearings in the saddles. All of the working parts including the springs and rollers with their anti-friction bearings are housed between and protected by the plates 6. The construction described serves to absorb all ordinary road shocks and vibrations, at the same time doing away with the ordinary pneumatic tire and the troubles incident to the use thereof.

What we claim is:—

A vehicle wheel comprising a fixed rim, an outside tire-carrying rim in spaced relation to said fixed rim, saddles fastened alternately to said rims, rollers journaled in said saddles, eccentric journal pins carried by said rollers, and bowed springs reversely arranged and fastened alternately to said rims and provided with terminal eyes which receive said journal pins.

In testimony whereof we affix our signatures in presence of two witnesses.

WILLIAM R. ALLEN.
ALOYSIUS McNALLY.

Witnesses:
JNO. J. PINCKNEY,
ANNA SCOTT.

Copies of this patent may be obtained for five cents each, by addressing the "Commissioner of Patents, Washington, D. C."